US008225307B2

(12) United States Patent
Baker et al.

(10) Patent No.: US 8,225,307 B2
(45) Date of Patent: Jul. 17, 2012

(54) ON-DEMAND SOFTWARE MODULE DEPLOYMENT

(75) Inventors: Bruce R. Baker, Markham (CA); Daniel A. Rose, Markham (CA)

(73) Assignee: International Business Machines Corporation, Armonk, NY (US)

(*) Notice: Subject to any disclaimer, the term of this patent is extended or adjusted under 35 U.S.C. 154(b) by 1289 days.

(21) Appl. No.: 10/989,152

(22) Filed: Nov. 15, 2004

(65) Prior Publication Data

US 2005/0108702 A1 May 19, 2005

(30) Foreign Application Priority Data

Nov. 14, 2003 (CA) ..................................... 2449534

(51) Int. Cl.
*G06F 9/44* (2006.01)
*G06F 9/445* (2006.01)
*G06F 15/177* (2006.01)

(52) U.S. Cl. ......... 717/174; 717/120; 717/172; 709/220

(58) Field of Classification Search ........................ None
See application file for complete search history.

(56) References Cited

U.S. PATENT DOCUMENTS

| | | | | |
|---|---|---|---|---|
| 5,721,824 A * | 2/1998 | Taylor | ............................ | 709/203 |
| 5,835,777 A * | 11/1998 | Staelin | ............................ | 717/175 |
| 6,892,382 B1 * | 5/2005 | Hapner et al. | .................. | 717/174 |
| 7,051,316 B2 * | 5/2006 | Charisius et al. | .............. | 717/103 |
| 7,107,576 B2 * | 9/2006 | Takahashi et al. | ............. | 717/172 |
| 7,150,014 B2 * | 12/2006 | Graupner et al. | .............. | 717/174 |
| 7,275,098 B1 * | 9/2007 | Becher et al. | .................. | 717/174 |
| 7,478,385 B2 * | 1/2009 | Sierer et al. | ................... | 717/174 |
| 7,523,177 B2 * | 4/2009 | Brittenham et al. | ........... | 709/220 |
| 7,559,059 B2 * | 7/2009 | Renaud | ........................ | 717/174 |
| 7,603,669 B2 * | 10/2009 | Curtis et al. | .................... | 717/174 |
| 7,716,660 B2 * | 5/2010 | Mackay | ........................ | 717/173 |
| 7,743,373 B2 * | 6/2010 | Avram et al. | ................... | 717/174 |
| 7,797,697 B2 * | 9/2010 | Woollen et al. | ................ | 717/170 |
| 7,861,243 B2 * | 12/2010 | Narayanaswamy et al. | .. | 717/172 |
| 8,046,755 B2 * | 10/2011 | Gaa-Frost et al. | .............. | 717/172 |
| 8,117,611 B2 * | 2/2012 | Doganata et al. | .............. | 717/174 |

(Continued)

OTHER PUBLICATIONS

Audris Mockus et al., Two Case Studies of Open Source Software Development: Apache and Mozilla [online], Jul. 2002, [retrieved on Mar. 2, 2012], pp. 309-346. Retrieve from Internet: <URL: http://dl.acm.org/citation.cfm?id=567795>.*

(Continued)

*Primary Examiner* — Thuy Dao
*Assistant Examiner* — Hahn T Bui
(74) *Attorney, Agent, or Firm* — Steven M. Greenberg, Esq.; Carey, Rodriguez, Greenberg & O'Keefe

(57) ABSTRACT

A method, system, program product and signal bearing medium embodiments of the present invention provide for deploying software modules for software application use in a computer system thereby reducing load time as well as memory requirements. Deployment of a plurality of software modules and associated deployment descriptors into a software module depository and creation of a deployment information repository from the associated deployment descriptors occurs. A name service is initialized with information from the deployment information repository and a requested software module identifier is then mapped to a respective enabler. Having mapped the requested software module to an enabler, the respective software module is enabled for the software application use. On-demand deployment in this manner saves start-up time as well as initial and ongoing memory allocation.

17 Claims, 11 Drawing Sheets

U.S. PATENT DOCUMENTS

| | | | |
|---|---|---|---|
| 2003/0061247 A1* | 3/2003 | Renaud | 707/205 |
| 2003/0126592 A1* | 7/2003 | Mishra et al. | 709/220 |
| 2003/0140126 A1* | 7/2003 | Budhiraja et al. | 709/220 |
| 2003/0159130 A1* | 8/2003 | Broussard et al. | 717/120 |
| 2003/0192031 A1* | 10/2003 | Srinivasan et al. | 717/174 |
| 2006/0037000 A1* | 2/2006 | Speeter et al. | 717/120 |
| 2006/0041643 A1* | 2/2006 | Fanshier | 709/220 |

OTHER PUBLICATIONS

Gang Huang, Post-Development Software Architecture [online], Sep. 2007, [retrieved on Mar. 2, 2012], pp. 1-9. Retrieve from Internet: <URL: http://delivery.acm.org/10.1145/1300000/1290996/p2-huang.pdf?>.*

* cited by examiner

ON-DEMAND SOFTWARE MODULE DEPLOYMENT

FIELD OF THE INVENTION

This present invention relates generally to using software modules in a computer system and more particularly to on-demand deployment of software modules used in a computer system.

BACKGROUND OF THE INVENTION

Typical operation of computerized applications such as those using Java 2 platform Enterprise Edition (J2EE) to incorporate Enterprise Java Beans (EJB) incurs process overhead for each and every EJB included in the application. Overhead is incurred at the start of the application in the form of start-up time delay and later during the life of the application through overall memory footprint. During a typical start-up of the application server the EJB modules contained within the application are typically examined, deployment descriptors typically parsed and home objects are typically instantiated and populated into the name service associated with the corresponding EJB container. As the application uses and finishes with the EJBs they are not released but are maintained. These EJBs are maintained within a pool of previously instantiated EJBs and re-used as required by the application. This subsequent pooling and caching of the already instantiated EJBs provides performance benefits during the processing of the application, avoiding the need to re-instantiate an EJB prior to re-use. This technique of initializing, loading and caching typically works well during the production mode of operation for the application. Performance is however obtained at the cost of resources in the form of initial application load time and ongoing memory footprint. Current techniques such as that just described typically load all the EJBs contained within the application at start-up, thereby increasing application start time and memory requirements.

An EJB container is usually responsible for registering unique look-up names within a Java Naming and Directory Interface (JNDI) namespace when the server starts and binding those names to home objects within the container.

A development environment typically has requirements differing from those of the production environment. In a development environment one needs to typically get a unit of work done as quickly as possible to verify operation of specific code elements of interest within the application. The development environment typically focuses on a smaller number of EJBs relative to the number of EJBs found in the application as a whole. Unfortunately the development environment must usually adhere to the same instantiation and maintenance practices as found in the production environment. Additionally a development environment is usually memory constrained not having access to the same amount of resource afforded the production environment.

Therefore what is required is a more effective way to create and operate a development environment using EJBs that allows for faster start-up while maintaining lower memory requirements as compared to that of a production environment.

SUMMARY OF THE INVENTION

A method, system, program product and signal bearing medium for deploying software modules for software application use in a computer system are provided. Deployment of software modules and associated descriptor information allow for selected requested software modules to be obtained and made available only as needed, resulting in reduced start-up delay and memory consumption as compared to that of a typical production environment.

In one aspect of the present invention, there is provided a method of deploying software modules for software application use in a computer system, said method comprising deploying of a plurality of software modules into a software module depository and deploying deployment descriptors associated with each of the plurality of software modules into a deployment information repository.

In another aspect of the present invention, there is provided a deployment system for deploying software modules for software application use in a computer system, comprising a first deployer for deploying a plurality of software modules into a software module depository and a second deployer for deploying deployment descriptors associated with each of the plurality of software modules into a deployment information repository.

In another aspect of the present invention there is provided a computer program product having a computer readable medium tangibly embodying computer readable program code for instructing a computer to perform the method for deploying of a plurality of software modules into a software module depository and deploying deployment descriptors associated with each of the plurality of software modules into a deployment information repository.

In yet another aspect of the present invention there is provided a signal bearing medium having a computer readable signal tangibly embodying computer readable program code for instructing a computer to perform a method for deploying of a plurality of software modules into a software module depository and deploying deployment descriptors associated with each of the plurality of software modules into a deployment information repository.

In another aspect of the present invention there is provided a computer program product having a computer readable medium tangibly embodying computer readable program code for instructing a computer system to provide the means of a first deployer for deploying a plurality of software modules into a software module depository and a second deployer for deploying deployment descriptors associated with each of the plurality of software modules into a deployment information repository.

In another aspect of the present invention there is provided a signal bearing medium having a computer readable signal tangibly embodying computer readable program code for instructing a computer to provide the means for first deployer for deploying a plurality of software modules into a software module depository and a second deployer for deploying deployment descriptors associated with each of the plurality of software modules into a deployment information repository.

Other aspects and features of the present invention will become apparent to those of ordinary skill in the art upon review of the following description of specific embodiments of the invention in conjunction with the accompanying figures. The illustrative embodiments of the present invention incorporate the use of Enterprise Java Beans. Those skilled in the art may appreciate that EJBs are but one form of software module which may be within the scope of the embodiments of the present invention. In the examples which follow one is reminded of the following relationships.

Enterprise Java Beans are but one embodiment of software modules and in general should not be taken as limiting applicability to use of the subject matter to Enterprise Java Beans.

Deployment descriptors associated with the EJBs may also be found in relationship to other implementations of software modules as a means of providing descriptive information regarding attributes of the particular software module type.

A software enabler is discussed within the following examples as a home object associated with an EJB. It is used to instantiate an EJB for software application use and may have a counterpart in other software implementations such as stub code for performing operations.

A name service as in the examples is referred to as a mapper providing mapping between the JNDI name space and home object implementation classes. Other techniques are available for this service as well such as a simple look up table or database table. Any suitable means for quickly resolving an input identifier to an out identifier is useful.

A property file is one form of resource used to provide extrinsic information regarding a software module or EJB. It may be replaced by another technique providing programmatic access to attribute information related to the software module or EJB as in the examples. Functionality could also be provided by way of lists, tables, arrays and objects.

BRIEF DESCRIPTION OF THE DRAWINGS

Embodiments of the invention will now be described, by way of example, with reference to the accompanying drawings, in which.

Figure 1:
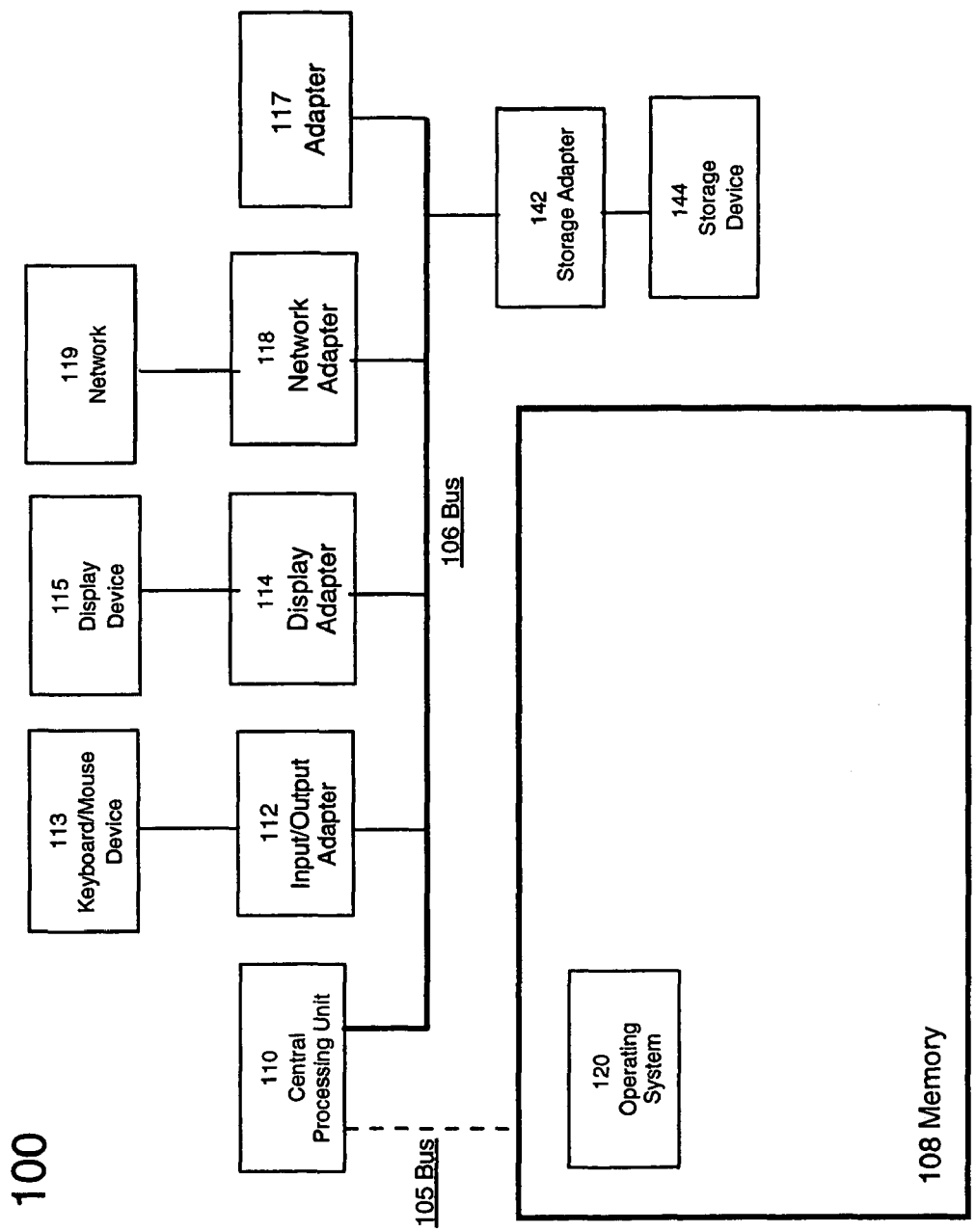
FIG. 1 is a hardware overview of a computer system, in support of embodiments of the present invention.

Like reference numerals refer to corresponding components and steps throughout the drawings. It is to be expressly understood that the description and the drawings are only for the purpose of illustration and as an aid to understanding, and are not intended as a definition of the limits of the invention.

DETAILED DESCRIPTION

FIG. 1 depicts, in a simplified block diagram, a computer system 100 suitable for implementing embodiments of the present invention. Computer system 100 has processor 110, which is a programmable processor for executing programmed instructions stored in memory 108. Memory 108 can also include hard disk, tape or other storage media. While a single CPU is depicted in FIG. 1, it is understood that other forms of computer systems can be used to implement embodiments of the invention. It is also, appreciated that embodiments of the present invention can be implemented in a distributed computing environment having a plurality of computers communicating via a suitable network 119.

CPU 110 is connected to memory 108 either through a dedicated system bus 105 and/or a general system bus 106. Memory 108 can be a random access semiconductor memory for storing application data for processing such as that in a database partition. Memory 108 is depicted conceptually as a single monolithic entity but it is well known that memory 108 can be arranged in a hierarchy of caches and other memory devices. FIG. 1 illustrates that operating system 120 may reside in memory 108.

Operating system 120 provides functions such as device interfaces, memory management, multiple task management, and the like as known in the art. CPU 110 can be suitably programmed to read, load, and execute instructions of operating system 120. Computer system 100 has the necessary subsystems and functional components to implement on-demand loading of software modules such as Enterprise Java Beans (EJBs) as will be discussed later. Other programs (not shown) include server software applications in which network adapter 118 interacts with the server software application to enable computer system 100 to function as a network server via network 119.

General system bus 106 supports transfer of data, commands, and other information between various subsystems of computer system 100. While shown in simplified form as a single bus, bus 106 can be structured as multiple buses arranged in hierarchical form. Display adapter 114 supports video display device 115, which is a cathode-ray tube display or a display based upon other suitable display technology. The Input/output adapter 112 supports devices suited for input and output, such as keyboard or mouse device 113, and a disk drive unit (not shown). Storage adapter 142 supports one or more data storage devices 144, which could include a magnetic hard disk drive or CD-ROM, although other types of data storage devices can be used, including removable media.

Adapter 117 is used for operationally connecting many types of peripheral computing devices to computer system 100 via bus 106, such as printers, bus adapters, and other computers using one or more protocols including Token Ring, LAN connections, as known in the art. Network adapter 118 provides a physical interface to a suitable network 119, such as the Internet. Network adapter 118 includes a modem that can be connected to a telephone line for accessing network 119. Computer system 100 can be connected to another network server via a local area network using an appropriate network protocol and the network server that can in turn be connected to the Internet. FIG. 1 is intended as an exemplary representation of computer system 100 by which embodiments of the present invention can be implemented. It is understood that in other computer systems, many variations in system configuration are possible in addition to those mentioned here.

Figure 2:
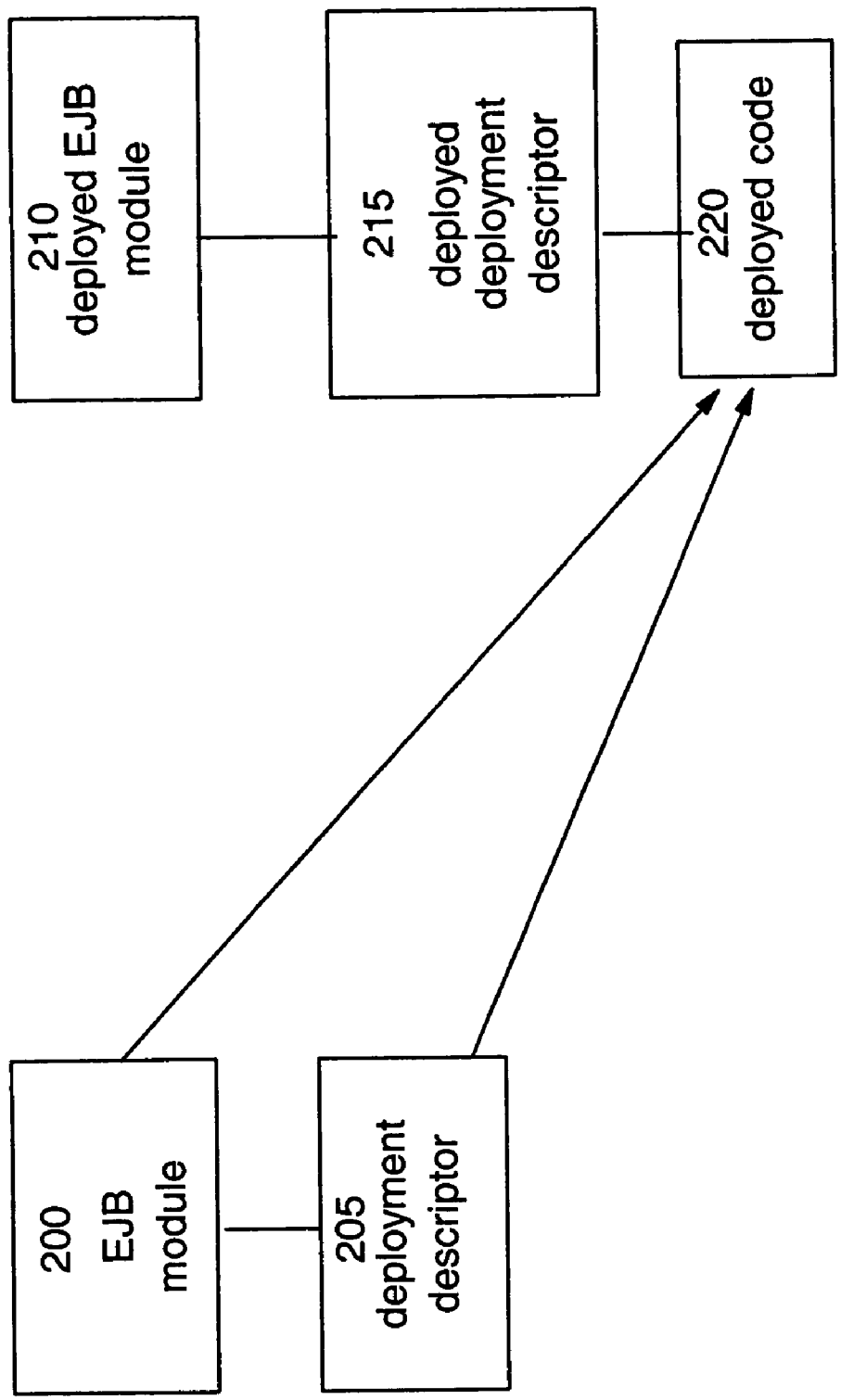
FIGS. 2, 3 and 4 are block diagrams showing typical EJB deployment into a production environment as supported in the computer system of FIG. 1.

FIG. 2 is a simplified view of a typical relationship between pre-deployment software components comprising software modules such as EJB module 200 and deployment descriptor 205 containing attribute information of the associated software module and post deployment software components comprising deployed EJB module 210, deployed deployment descriptor 215 and deployed code 220 resulting from a deployment operation of EJBs. Deployed deployment descriptor 215 is also kept with deployed EJB module 210 as it will be used later during server initialization. Not all server required information was captured in the deployed EJB module 210, hence the maintenance of deployed deployment descriptor 215.

Figure 3:
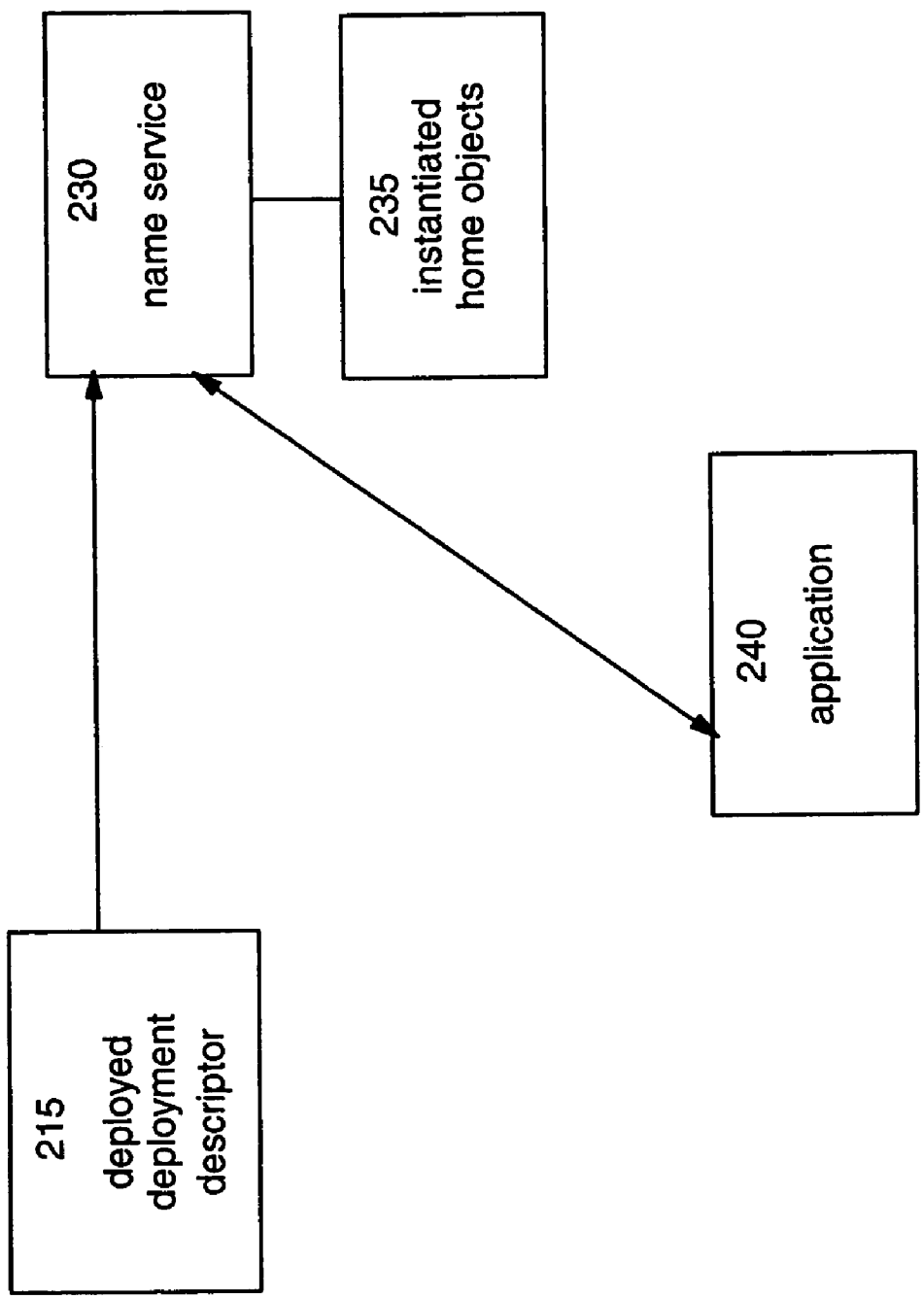

FIG. 3 is a block diagram showing the typical components of deployed EJBs of FIG. 2 after server initialization has completed. Deployed deployment descriptor 215 provides information for the further establishment of name service 230. All of the EJBs specific to application 240 will be loaded in the form of preloaded home objects 235 and made available for application 240 uses by way of server initialization. Name service 230 provides a lookup service to resolve Java Naming and Directory Interface (JNDI) home object names to the implementation of various classes. Deployed deployment descriptor 215 may be a copy of deployment descriptor 205 in a deployed format.

Figure 4:
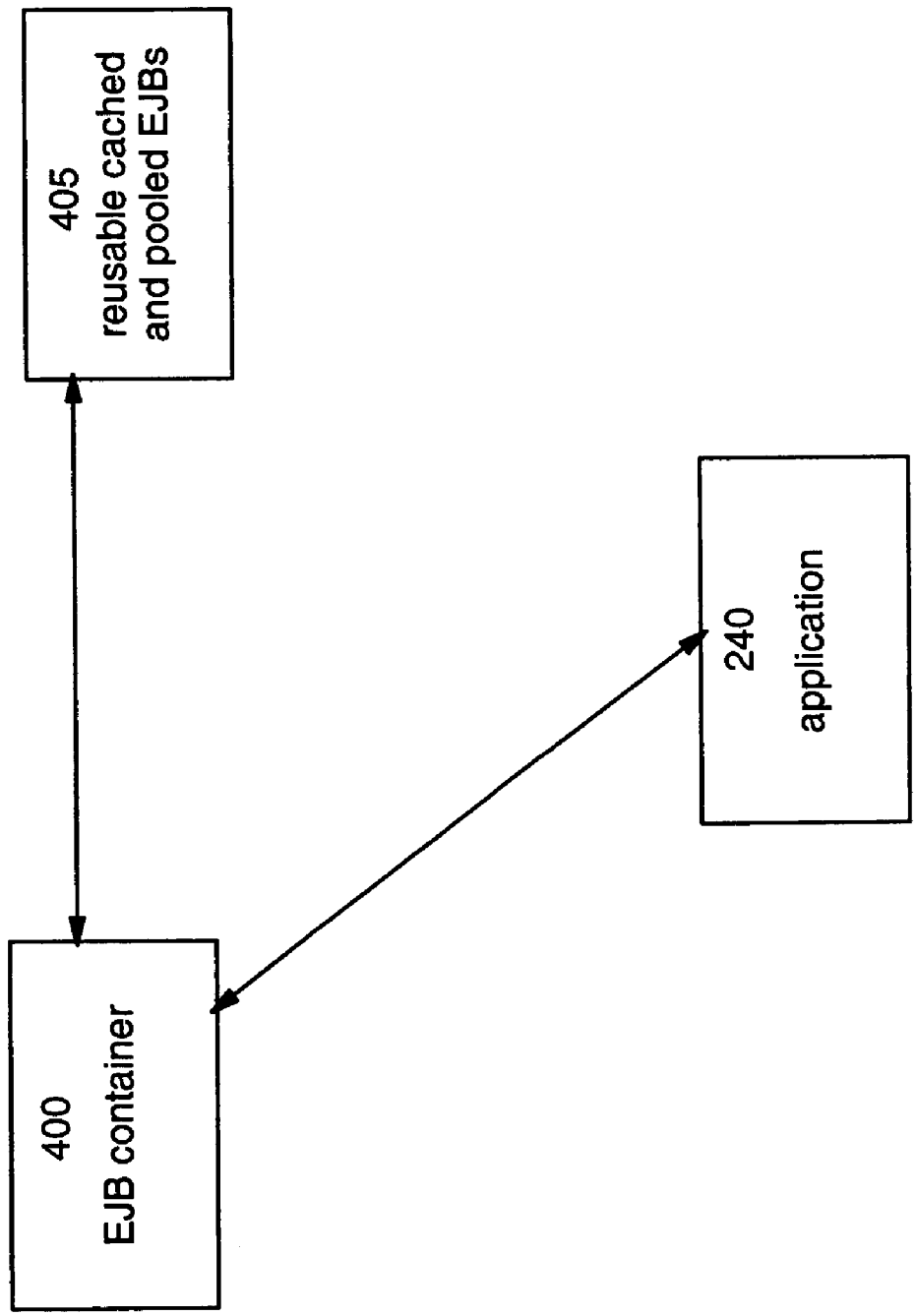

Referring now to FIG. 4, EJB container 400 is shown associated with and managing reusable cached and pooled objects 405. EJBs which have been previously used by application 240 are recycled by means of reusable cached and pooled objects 405. EJBs once used are not discarded; they are placed in reusable cached and pooled objects 405 to await further use requests.

Figure 5:
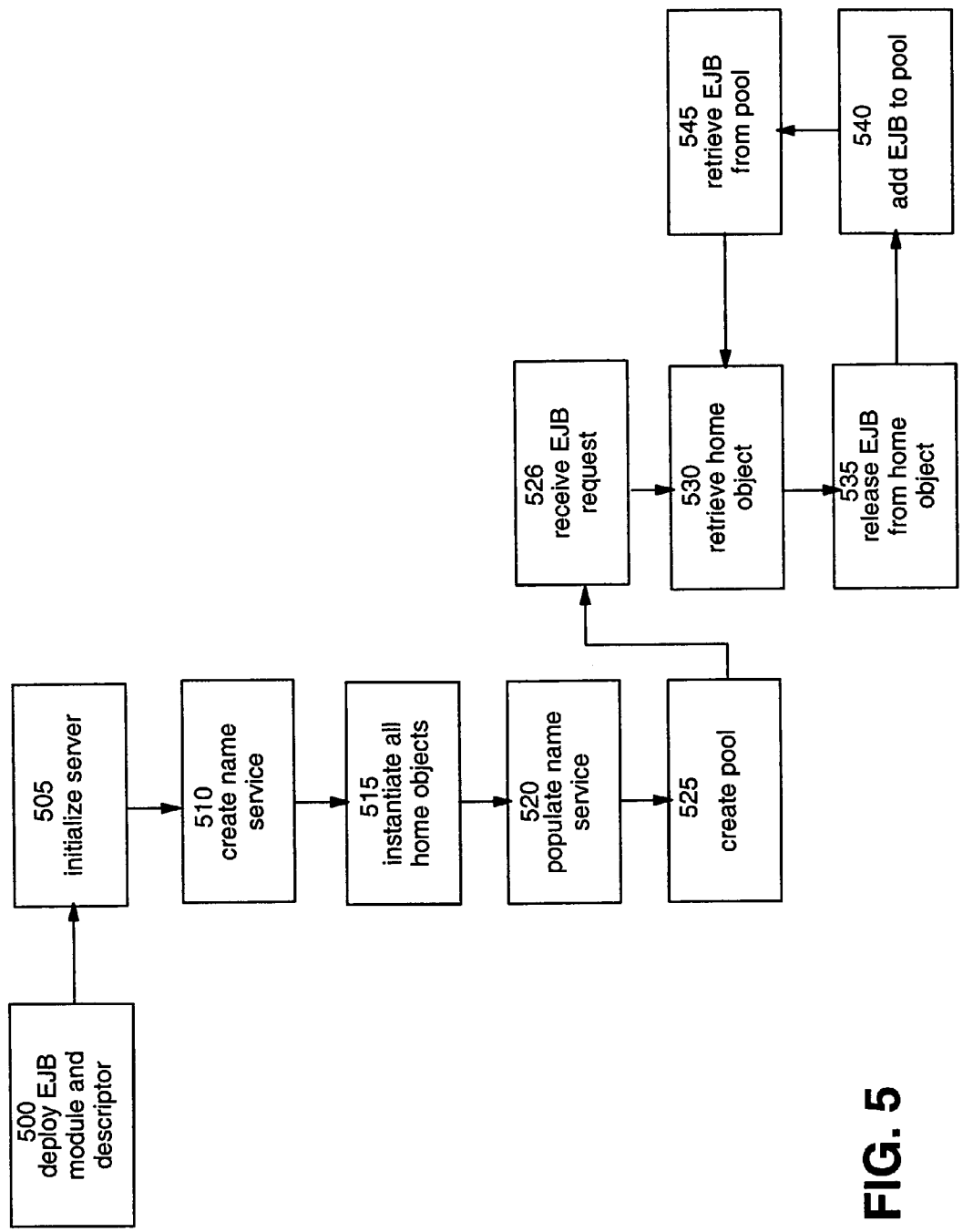
FIG. 5 is a flow diagram of a typical process of deploying an EJB into a production environment as suggested in FIGS. 2, 3 and 4.

Referring now to FIG. 5 a typical process inherent in the discussion of FIGS. 2, 3 and 4 is shown. Beginning with operation 500 the EJB module and its associated descriptor are deployed into a production environment of the previous examples. Having completed deployment, processing moves to operation 505 during which the server is initialized. Having initialized the server processing moves to operation 510 during which the name service to be used for resolving named home object requests is created. The name service is required for object retrieval. During operation 515 all of the EJBs used in the application are found for which are created home objects. All of the home objects created during operation 515 are then used to populate the naming service during operation 520. Having finished populating the name service, processing moves to operation 525 during which a storage pool is created. The storage pool is used to maintain previously used EJBs pending their further use. During operation 526 a request for a home object is received and the home object requested is then retrieved during operation 530. A home object acts as a software enabler, making a requested EJB available for use by a requesting software application. If the home object requested was previously used it has an associated EJB that was cached in the pool and that EJB will then be retrieved during operation 545. If the application has completed use of a home object it will release the EJB associated with the home object during operation 535. Having released an EJB from the home object during operation 535, the associated EJB is then moved to the pool during operation 540 where it resides awaiting further use, where it may again be retrieved by way of operation 545 as before.

Figure 6:
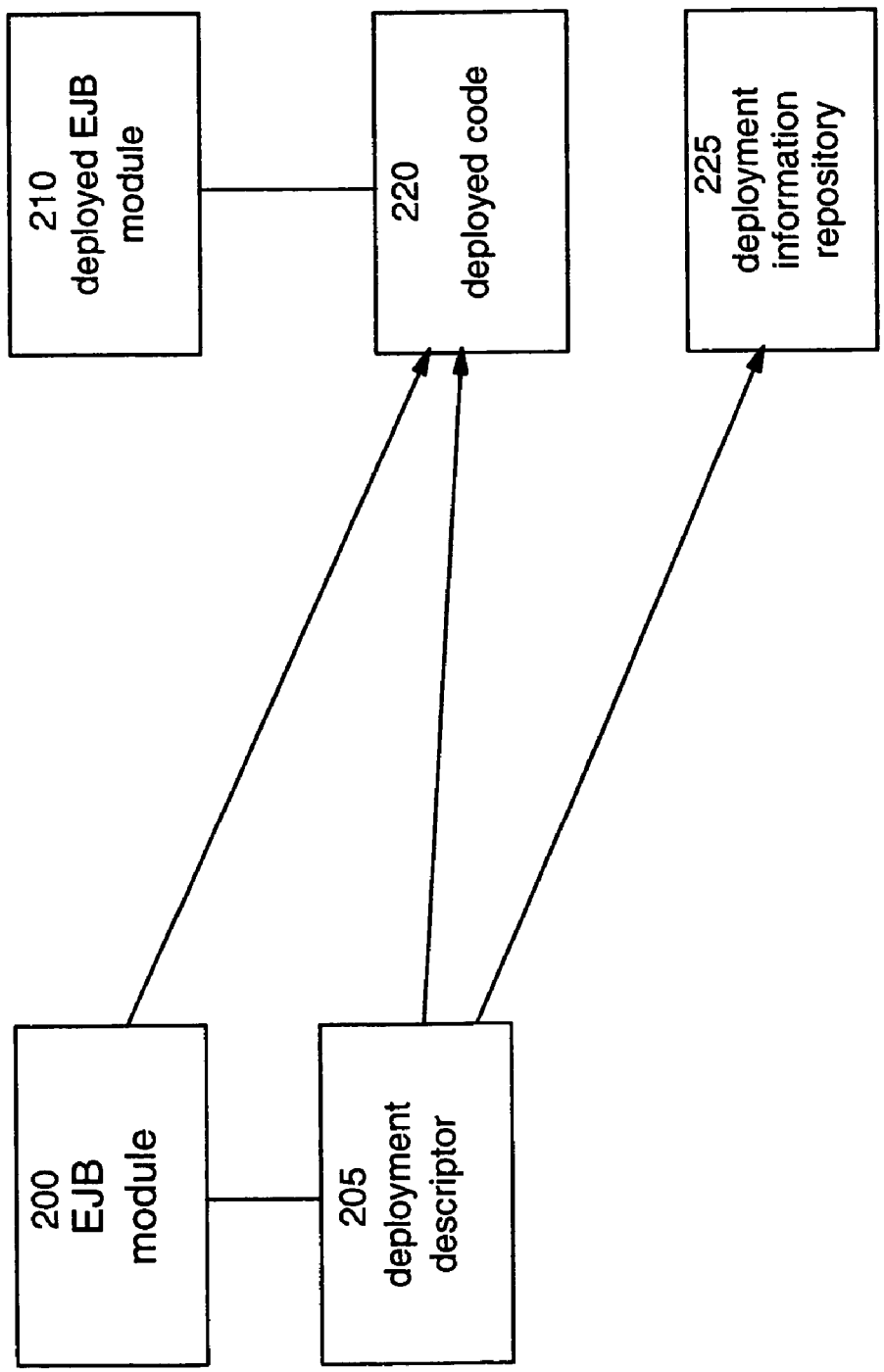
FIGS. 6, 7 and 8 are block diagrams showing an EJB deployment into a development environment in an embodiment of the present invention.

Having described a typical production view a different environment having been optimized in accordance with embodiments of the present invention will now be discussed. Referring now to FIG. 6 there is shown as before EJB module 200 and deployment descriptor 205. Deploying EJB module 200 and deployment descriptor 205 causes deployed EJB module 210, deployed code 220 and deployment information repository 225 to be created. Deployment of EJB module 200 and deployment descriptor 205 may be accomplished using a single deployer combining both capabilities or separate deployers as in a first and second deployer established to handle an EJB module and deployment descriptor respectively as part of a deployment system. Deployment information repository 225 contains all of the necessary information needed by the server during initialization at start-up. Creation of deployment information repository 225 eliminates the need for maintaining the copy of deployment descriptor 205 in a post deployment form. Deployment information repository 225 contains parsed input from deployment descriptor 205 eliminating the need to have deployment descriptor 205 parsed yet again during server initialization. Deployment information repository 225 may be implemented in any suitable form as is known in the art. A suitable implementation may be in the form of a property file mapping JNDI home object names to the implementation classes. In a similar manner lookup tables may be used as well as relational tables, arrays, indexed arrays or other means may be used to provide fast efficient resolution.

This embodiment will delay the loading of EJBs until they are actually requested by the application typically allowing the application to be ready sooner than otherwise possible. Further a reduction in memory allocation at start-up is typically possible due to the reduced number of EJBs to be loaded into storage as well as on an ongoing basis only having those which are used loaded.

Figure 7:
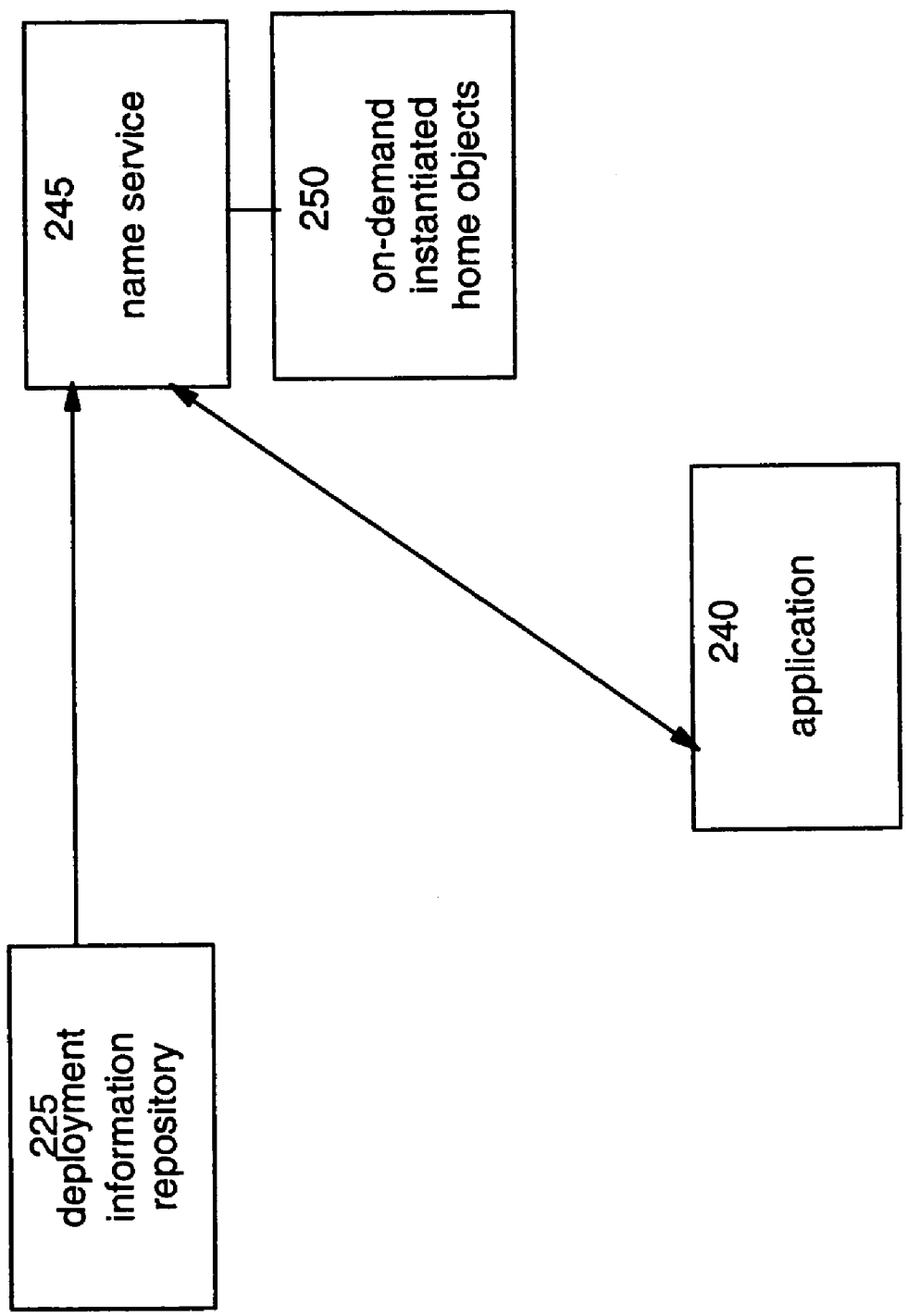

FIG. 7 shows in block form a relationship between deployment information repository 225 and name service 245. Name service 245 is used to resolve the EJB name passed by the application to the proper request-loaded home objects 250 as requested by application 240. Name service 245 possesses intelligence in order to find the mapping between a requested EJB and on-demand instantiated home object 250 to perform the needed retrieval. On-demand instantiated home objects 250 are created on a call by call basis as EJBs are requested for use by application 240. No home object is created until a request has been received from application 240. When application 240 requests name service 245 to find an EJB home object, name service 245 will use information in deployment information repository 225 to locate and instantiate the required home object implementation classes.

Figure 8:
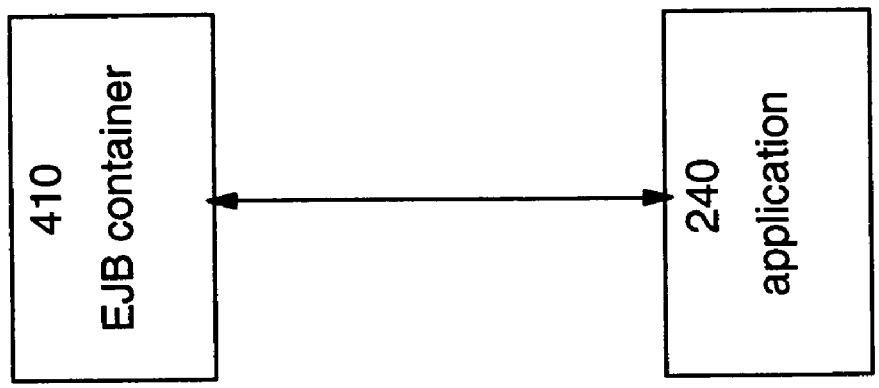

Referring now to FIG. 8 EJB container 410 may be seen with application 240. No additional storage is maintained by EJB container 410 to hold on-demand instantiated home objects 250 as they are released from application 240 after each use. As on-demand instantiated home objects 250 are released they are made available for garbage collection and subsequent disposal.

Figure 9:
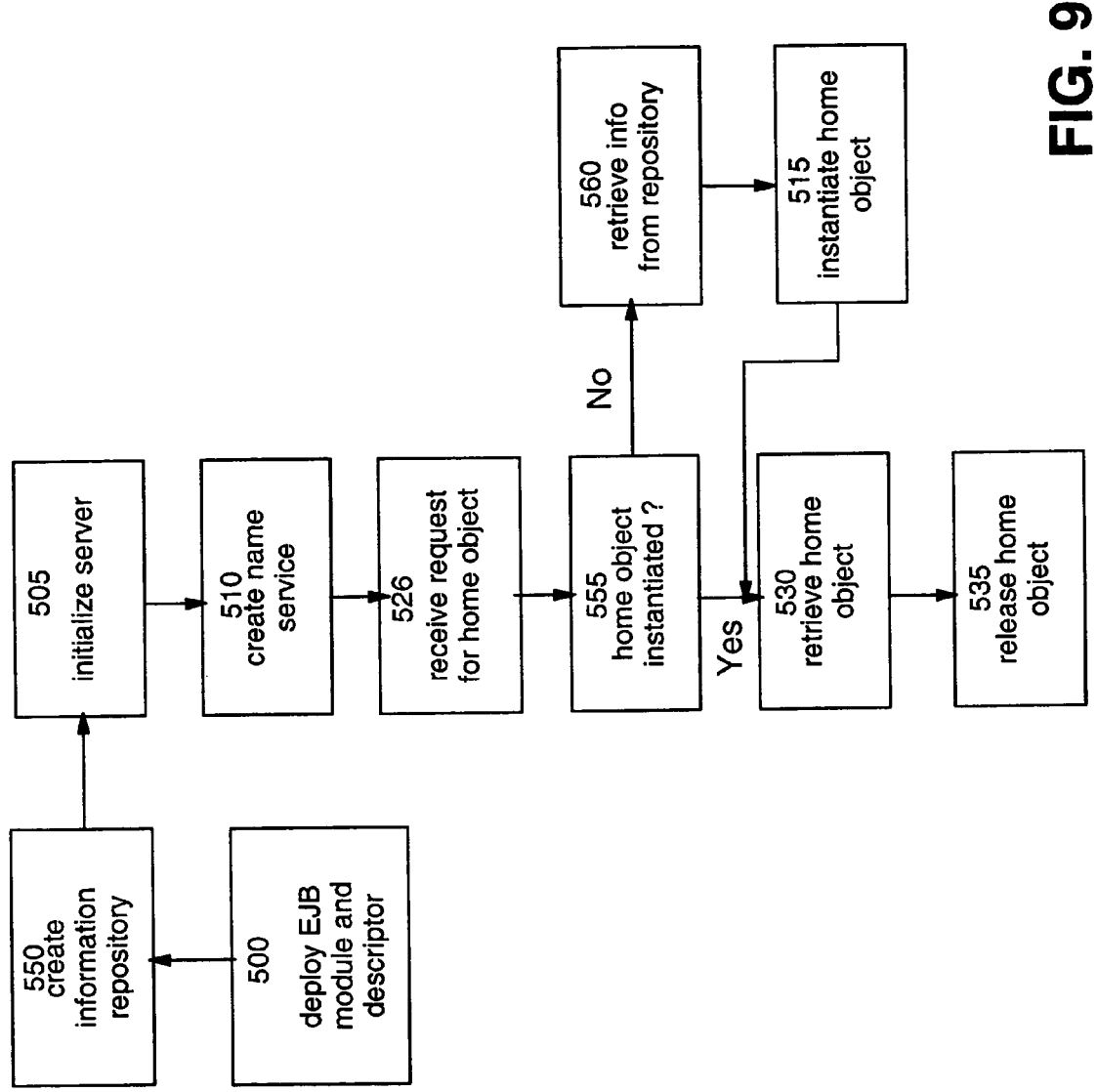
FIG. 9 is a flow diagram showing a process of an EJB deployment into a development environment in an embodiment of the invention as suggested in FIGS. 6, 7 and 8.

Referring now to FIG. 9 a typical process of an embodiment of the invention that may be used typically in an environment such as in a development mode using EJBs is shown. Beginning with operation 500 an EJB module and associated deployment descriptor are deployed. As part of the deployment an information repository is created during operation 550 to contain information needed during server initialization. Server initialization is then performed during operation 505. Processing moves to operation 510 during which a name service is created to resolve mappings between EJBs requested by an application and home objects providing runtime support. During operation 526 a request is received needing a home object. A determination is then made in operation 555 as to whether the home object has been loaded. If the requested home object is found, it is then retrieved during operation 530, otherwise processing moves to operation 560. During operation 560 information is retrieved from the deployment information repository for the specific EJB and processing moves to operation 515, during which the home object is instantiated and made ready for use by the application. Processing moves to operation 530 and as before the home object is retrieved for application use. After application use of the home object, processing moves to operation 535 during which the used home object is discarded as it is no longer required.

Figure 10:
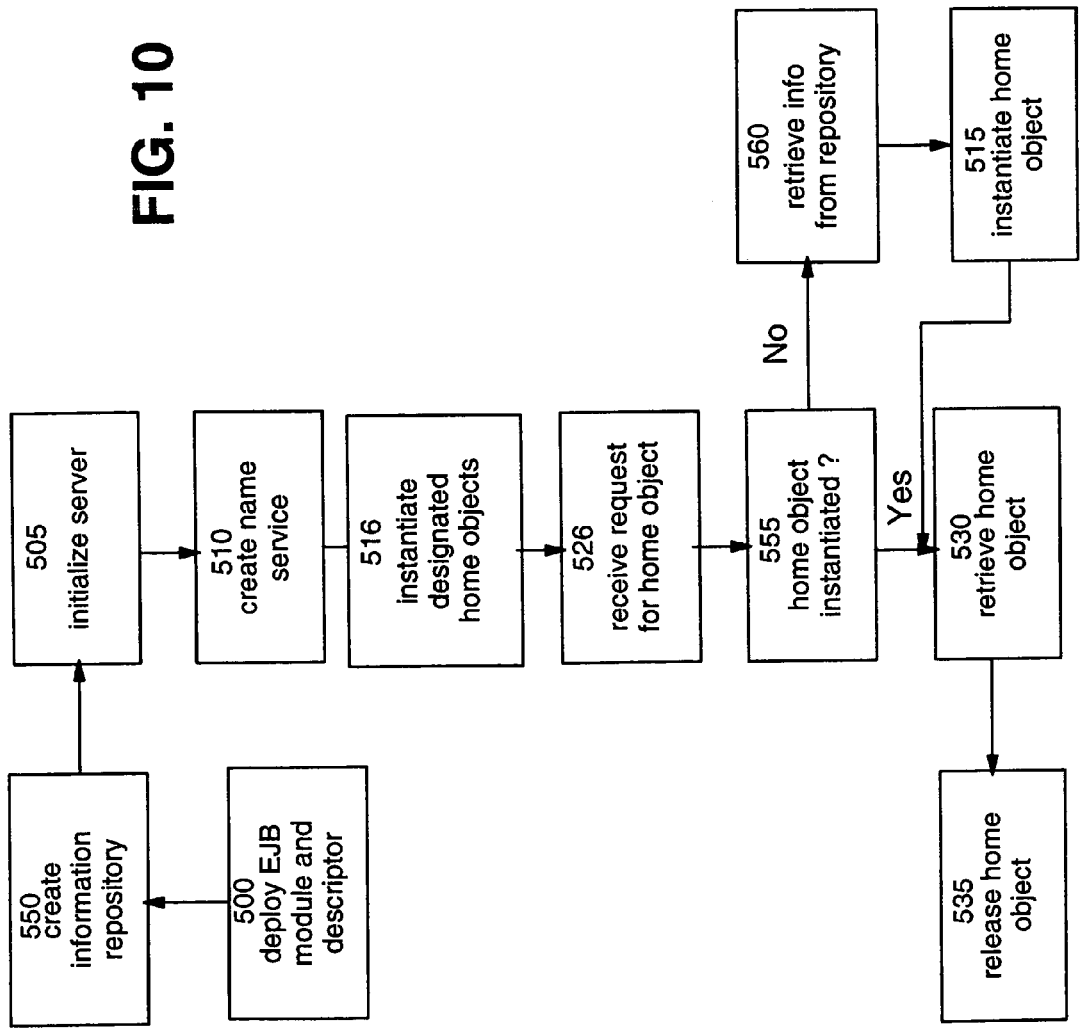
FIG. 10 is a flow diagram showing an embodiment of the present invention as shown in FIG. 9 with designated home objects.

Referring now to FIG. 10 a typical process of another embodiment of the invention that may be used typically in an environment such as in a development mode using EJBs is shown. Beginning with operation 500 an EJB module and associated deployment descriptor are deployed. As part of the deployment an information repository is created during operation 550 to contain information needed during server initialization. Server initialization is then performed during operation 505. Processing moves to operation 510 during which a name service is created to resolve mappings between EJBs requested by an application and home objects providing runtime support. Having completed operation 510, operation 516 begins during which designated home objects are instantiated. These designated home objects are a number of EJBs which have been determined to be made available prior to execution of the application rather than waiting for eventual requests from the application. Examples of such EJBs may be those dealing typically with housekeeping or security operations or other functions which are commonly used and useful in a variety of environments. Designated home objects may be so chosen for any reason, the reason not being of import rather it is the facility being offered. Locating designated home objects may be performed by way of resource files as used in various programming environments, simple lists, arrays, indexed arrays and tables. Typical numbers of such designated home objects will be small relative to the number available to the related application. Retrieval of such names should be simple and fast to ensure rapid loading of the environment. During operation 526 a request is received having an associated home object. A determination is then made in operation 555 as to whether the home object has been loaded. If the requested home object is found, it is then retrieved during operation 530, otherwise processing moves to operation 560. During operation 560, information is retrieved from the deployment information repository for the specific EJB and processing moves to operation 515, during which the home object is instantiated and made ready for use by the application. Processing moves to operation 530 and as before the home object is retrieved for application use. After application use of the home object, processing moves to operation 535 during which the used home object is discarded as it is no longer required.

Figure 11:
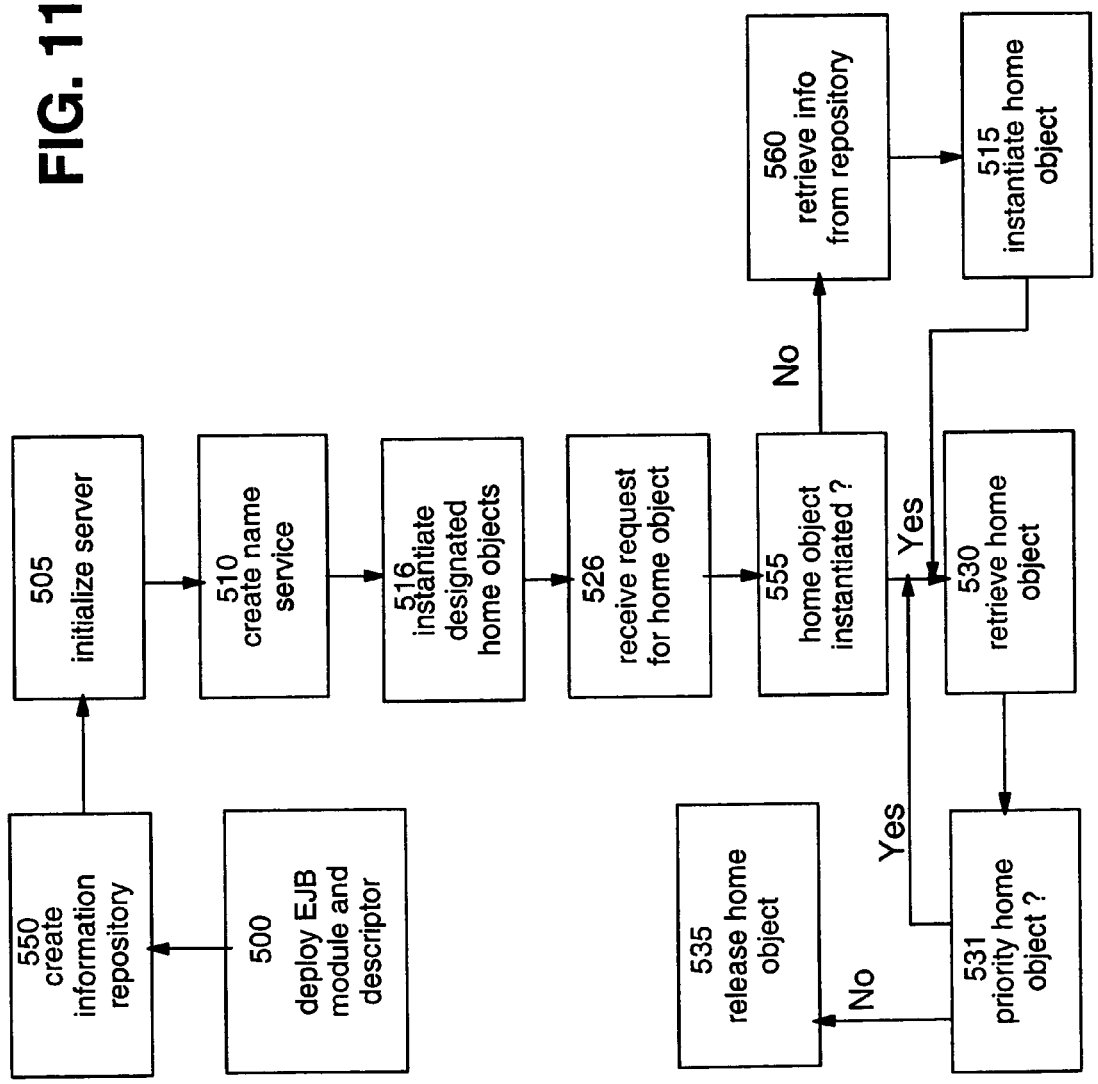
FIG. 11 is a flow diagram showing an embodiment of the present invention as shown in FIG. 10 with prioritized home objects.

Referring now to FIG. 11 a typical process of yet another embodiment of the invention that may be used typically in an environment such as in a development mode using EJBs is shown. Beginning with operation 500 an EJB module and associated deployment descriptor are deployed. As part of the deployment an information repository is created during operation 550 to contain information needed during server initialization. Server initialization is then performed during operation 505. Processing moves to operation 510 during which a name service is created to resolve mappings between EJBs requested by an application and home objects providing runtime support. Having completed operation 510, operation 516 begins during which designated home objects are instantiated. These designated home objects are a number of EJBs which have been determined to be made available prior to execution of the application rather than waiting for eventual requests from the application. Examples of such EJBs may be those dealing typically with housekeeping or security operations or other functions which are commonly used and useful in a variety of environments. Designated home objects may be so chosen for any reason, the reason not being of import rather it is the facility being offered. During operation 526 a request is received having an associated home object. A determination is then made in operation 555 as to whether the home object has been loaded. If the requested home object is found, it is then retrieved during operation 530, otherwise processing moves to operation 560. During operation 560, information is retrieved from the deployment information repository for the specific EJB and processing moves to operation 515, during which the home object is instantiated and made ready for use by the application. Processing moves to operation 530 and as before the home object is retrieved for application use. After application use of the home object, processing moves to operation 531 during which a determination is made regarding the priority of the used home object. If the home object was required for future processing it would have an entry in a priority list and be retained within the EJB container for subsequent retrieval. On the other hand if it is no longer required it would not be located on a priority list and processing would move to operation 535 during which the home object is discarded. Home objects which would be typical candidates for inclusion on a priority list may be those designated earlier as designated home objects or those which may have been recorded as a result of test conditions. A variety of rationale may be used to determine candidates for prioritization. Prioritized home objects may be so chosen for a number of reasons, the reason not being of import rather it is the facility being offered. Locating designated home objects may be performed by way of resource files as used in various programming environments, simple lists, arrays, indexed arrays and tables. Typically numbers of such prioritized home objects will be small relative to the number available to the related application. Retrieval of such names should be simple and fast to ensure rapid loading of the environment.

Although the invention has been described with reference to illustrative embodiments, it is to be understood that the invention is not limited to these precise embodiments and that various changes and modifications may be effected therein by one skilled in the art. All such changes and modifications are intended to be encompassed in the appended claims.

What is claimed is:

1. A method of deploying software modules for use by a software application in a computer system, said method comprising:
   deploying a plurality of software modules into a software module depository;
   deploying deployment descriptors associated with each of said plurality of software modules into a deployment information repository;
   enabling a plurality of designated software modules;
   providing a mapping between an identifier for each said deployed software module and a respective software enabler;
   receiving said identifier from said software application;
   enabling a software module associated with said identifier for said software application use; and
   maintaining availability of said software module within said software module depository upon said software module being a priority software module and releasing said software module upon completion of said software application use upon said software module not being a priority software module.

2. A method, within a computer hardware system, of deploying software modules for use by a software application, said method comprising:
   deploying a plurality of software modules into a software module depository;
   populating a deployment information repository with parsed inputs from deployment descriptors associated with each of said plurality of software modules;
   within said deployment information repository, mapping an identifier for each said deployed software module to a respective software enabler, said mapping includes:
   receiving said identifier from said software application;
   locating the respective software enabler for said identifier in said deployment information repository; and enabling said deployed software module associated with said identifier for use by said software application; and releasing said deployed software module upon completion of the use of said software module by said software application, said releasing includes:
upon completion of said software application use of said software module and based upon a determination of whether said software module is a priority software module, selecting between:
maintaining availability of said software module within said software module depository upon said software module being a priority software module; and
releasing said software module upon said software module not being a priority software module;
wherein
said deployment information repository separate from said plurality of software modules and the software application.

3. The method of claim 2, wherein said locating is performed by a name service in communication with said deployment information repository.

4. The method of claim 2, wherein said deployment information repository is a property file.

5. The method of claim 2, wherein said deployment information repository is selected from a group consisting of:
a property file, an array, an indexed array, a database table, and a simple name-value pair list.

6. The method of claim 2, wherein releasing said software module further includes garbage collection.

7. The method of claim 2, further comprising maintaining a list of prioritized software modules within said software module depository.

8. The method of claim 2, wherein at least one of said software modules is an Enterprise Java Bean module.

9. A method for deploying software modules for use by a software application in a computer system, said method comprising:
deploying a plurality of software modules into a software module depository;
populating a deployment information repository with parsed inputs from deployment descriptors associated with each of said plurality of software modules, wherein said deployment information repository separate from said plurality of software modules and the software application;
within said deployment information repository, mapping an identifier for each said deployed software module to a respective software enabler, said mapping includes:
receiving said identifier from said software application;
determining whether said identifier represents a designated software module, and based upon the determination selecting between
(i) returning said designated software module to said application for use, and
(ii) locating the respective software enabler for said identifier in said deployment information repository; and
enabling said designated software module associated with said identifier for use by said software application; and
enabling a plurality of designated software modules.

10. The method of claim 9, wherein said plurality of designated software modules is a subset of software modules associated with said software application.

11. A deployment hardware system for deploying software modules for use by a software application in a computer hardware system, comprising:

a first deployer configured to deploy a plurality of software modules into a software module depository;
a second deployer configured to deploy parsed inputs from descriptors associated with each of said plurality of software modules into a deployment information repository separate from said plurality of software modules and the software application;
a mapper configured to map between an identifier for each said deployed software module and a respective software enabler, said mapper includes:
a receiver configured to receive said identifier from said software application;
a locator configured to locate a respective software enabler for said identifier in said deployment information repository; and
an enabler configured to enable said software module associated with said identifier for said software application use; and
a release mechanism for releasing said software module upon completion of said software application use, said release mechanism includes:
a comparator for determining said software module is a priority home object upon completion of use by said software application, maintaining availability of said software module; and
a discarder for releasing said corresponding one of said plurality of home objects when not maintained.

12. The deployment hardware system of claim 11, wherein said locator is a name service in communication with said deployment information.

13. The deployment hardware system of claim 11, wherein said deployment information repository is a property file.

14. The deployment hardware system of claim 11, wherein said deployment information repository is selected from a group comprising:
a property file, an array, an indexed array, a database table and a simple name-value pair list.

15. The deployment hardware system of claim 11, wherein said release mechanism further includes garbage collection.

16. The deployment hardware system of claim 11, further comprising a maintainer for maintaining a list of prioritized home objects within said EJB container.

17. A computer-readable storage medium having computer-readable instructions stored thereon for deploying software modules for use by a software application in a computer hardware system, the computer-readable instructions, upon being executed by a deployment hardware system, causes the deployment hardware system to perform:
deploying a plurality of software modules into a software module depository;
deploying deployment descriptors associated with each of said plurality of software modules into a deployment information repository;
enabling a plurality of designated software modules;
providing a mapping between an identifier for each said deployed software module and a respective software enabler;
receiving said identifier from said software application;
enabling a software module associated with said identifier for said software application use; and
maintaining availability of said software module within said software module depository upon said software module being a priority software module and releasing said software module upon completion of said software application use upon said software module not being a priority software module.

* * * * *